United States Patent [19]
Valantin

[11] 3,804,221
[45] Apr. 16, 1974

[54] FRICTION COUPLING WITH FLUID OPERATED DIAPHRAGM

[75] Inventor: Alfred Valantin, Clermont, France

[73] Assignee: Charbonnages De France, Paris, France

[22] Filed: Mar. 30, 1972

[21] Appl. No.: 239,636

[30] Foreign Application Priority Data
Apr. 6, 1971  France .............................. 71.12169

[52] U.S. Cl. .............. 192/88 B, 192/88 A, 188/367
[51] Int. Cl. ........................................... F16d 25/04
[58] Field of Search .......... 192/88 B, 107 T, 113 B; 188/367

[56] References Cited
UNITED STATES PATENTS

| | | | |
|---|---|---|---|
| 3,547,244 | 12/1970 | Fergle | 192/88 B |
| 3,073,424 | 1/1963 | Russell | 192/113 B |
| 3,347,345 | 10/1967 | Rogers et al. | 192/113 B |
| 2,093,281 | 9/1937 | Kreuser | 192/88 B X |
| 3,648,812 | 3/1972 | Kost | 192/88 B |

FOREIGN PATENTS OR APPLICATIONS

| | | | |
|---|---|---|---|
| 630,719 | 6/1936 | Germany | 192/88 B |

Primary Examiner—Benjamin W. Wyche
Attorney, Agent, or Firm—Karl W. Flocks

[57] ABSTRACT

A friction coupling device for effecting clutching or braking action between two relatively movable members, has a thin flexible partition between opposed surfaces of those members, one of which surfaces is recessed to receive protuberances on the partition which is sealed against that surface to define an expansible chamber which communicates with a supply of pressurised hydraulic fluid which causes the partition to deform against the surface of the other member to provide the desired coupling.

2 Claims, 6 Drawing Figures

FIG. I.

FRICTION COUPLING WITH FLUID OPERATED DIAPHRAGM

BACKGROUND OF THE INVENTION

1. Field of the Invention

This invention relates to friction coupling devices, of the kind for coupling two members which, before coupling, may perform a translational or rotational movement relative to each other. The coupling may be complete in order to provide a clutching or locking action for example, or the coupling may be partial in order, to provide a braking action for example.

2. Description of the Prior Art

Friction coupling devices have been proposed which employ an expansible fluid-tight chamber which is inserted between the two elements to be coupled and which is driven rotationally by one of the two elements, the expansion of this chamber under the action of a hydraulic or pneumatic pressure pressing one of the walls of the chamber into frictional contact with the element disposed opposite said wall.

In order to be able to utilise the considerable forces generated in a coupling of this kind, that is high torque in the case of a clutch and high braking forces in the case of a brake, it has already been proposed to form the expansible chamber with an intermediate part welded fluid-tight to one of the two elements, and by means of a recess formed either in the intermediate part or in the element on which this part is fixed. The dimensions of the recess and the thickness of the intermediate part have been so selected that the portion of the intermediate part which is situated opposite the recess will be sufficiently thin to enable it to be deformed under the action of pressurised hydraulic fluid introduced into the recess.

When the forces involved are discontinuous and applied repetitively, with an arrangement of this kind it was found that the welded connections fixing the intermediate part on the corresponding element are relatively rapidly broken as the result of fatigue of the metal of the welded connections.

The present invention provides friction coupling devices which overcome this disadvantage while making it possible to utilise greater coupling forces than with known devices.

SUMMARY

A friction coupling device according to the present invention comprises two relatively movable members, usually a driving member and a driven member, having opposing coupling surfaces. One of the members has a plurality of recesses in its coupling surface which are all connected by channels through the member to an hydraulic fluid supply. A thin intermediate part is located between the opposing coupling surfaces which part has a plurality of protuberances each fitting into one of said recesses without filling it. A seal is provided between the intermediate part and the recessed surface to form a sealed expansible chamber which expands when pressurised hydraulic fluid is supplied simultaneously to the recesses to deform the intermediate part into friction-coupling engagement with the coupling surface of the other member.

BRIEF DESCRIPTION OF THE DRAWINGS

FIG. 6 illustrates diagrammatically the cutting head of a mining machine, the rotary tool of which is driven by the friction coupling device illustrated in FIG. 5.

DESCRIPTION OF THE PREFERRED EMBODIMENTS

Figure 1:
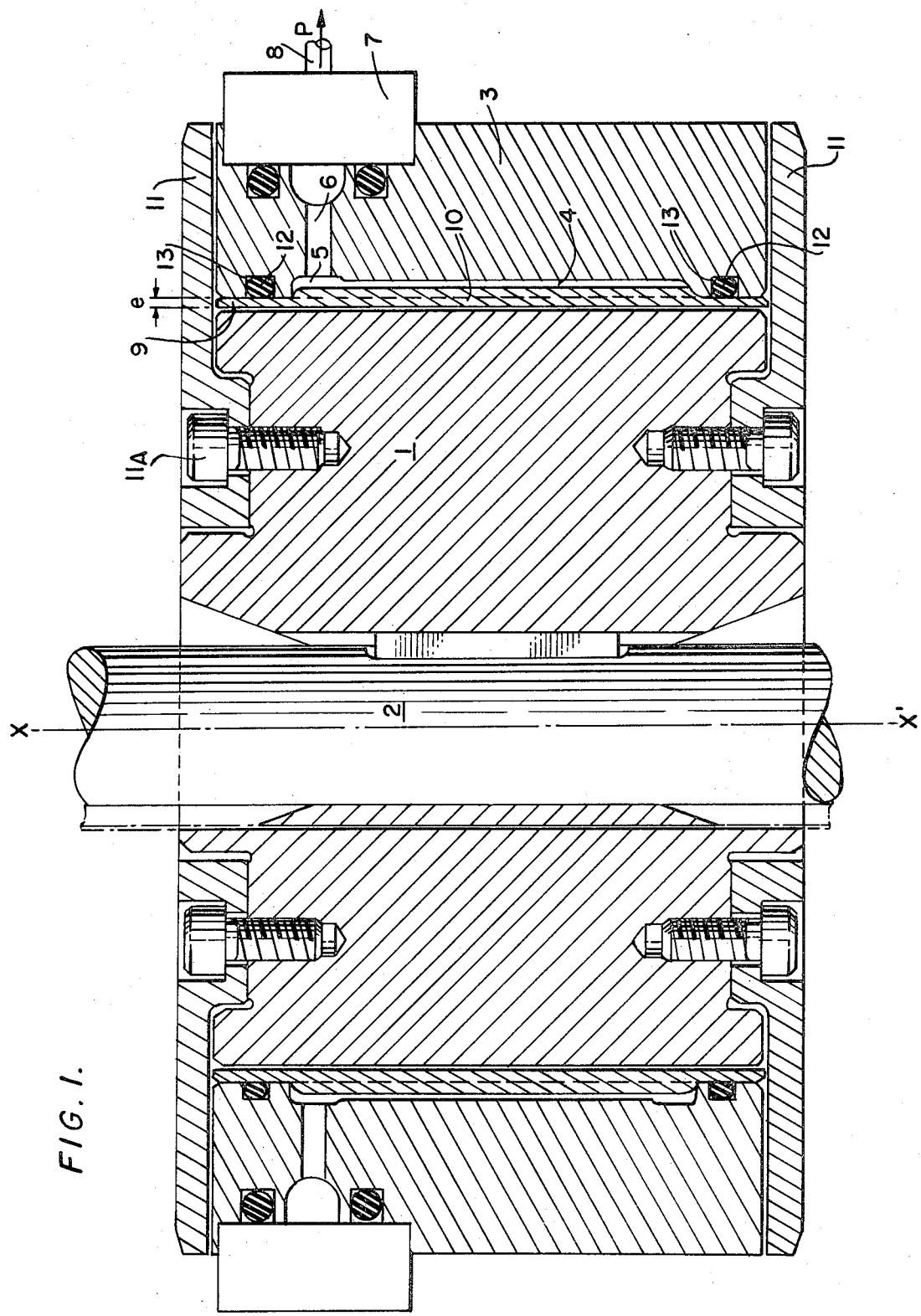
FIG. 1 is a diagrammatic section partly in elevation of a friction coupling device according to the invention suitable for coupling together two coaxial cylindrical parts disposed one within the other.
Figure 2:
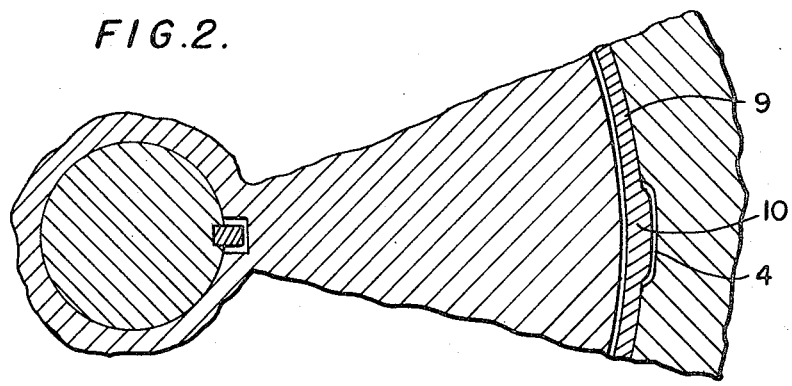
FIG. 2 is a partial cross-section through the device of FIG. 1, taken at right angles to the section of FIG. 1.

The principle of friction coupling devices according to the invention is illustrated in FIG. 1, which shows the construction of a clutch between a hub 1 rotatably connected to a shaft 2 having the axis XX' and a crown 3 surrounding said hub. According to the invention, the crown 3 has recesses 4 parallel to the axis XX', and in communication with a cylindrical groove 5 which communicates through bores 6 with a fixed rotary-joint distributor 7 to which is connected a supply pipe 8 for pressurised hydraulic fluid. An intermediate part 9 is located between the opposed coupling surfaces of the crown 3 and the hub 1 and is in the form of a thin cylinder, and is provided with a number of protuberances 10 equal to the number of recesses 4, each protuberance fitting into one of the recesses without completely filling it.

The intermediate part 9 is held longitudinally by means of two flanges 11 fixed to the hub 1 by means of bolts 11A. Sealing between the crown 3 and the intermediate part 9 is provided by two sealing rings 12 disposed one at each end of the recesses.

The arrangement operates in a known manner by deformation of the intermediate part by introducing into the recesses an hydraulic fluid at a suitable pressure P. In order to maintain the seal between the crown 3 and the intermediate part 9 when the deformation of the part 9 is a maximum, the depth of the grooves 13 is such that the sealing rings 12 are still compressed when the intermediate part is at maximum deformation and is in contact with the hub.

The present invention is applicable to all friction coupling devices using an expansible chamber.

Figure 3:
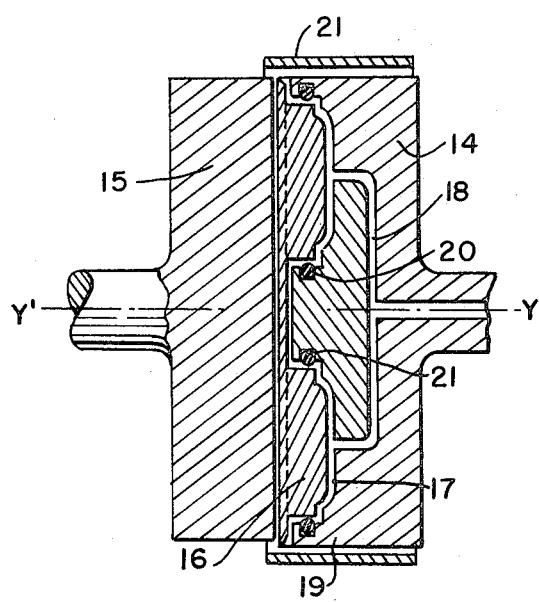
FIG. 3 is a sectional elevation through another embodiment suitable for coupling two flat surfaces disposed face-to-face.
Figure 4:
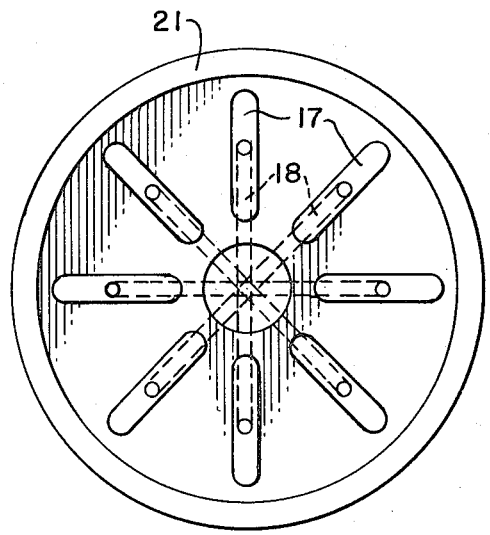
FIG. 4 is an end view of the one of the two flat surfaces of the device of FIG. 3 in which surface recesses are formed.

This, it is applicable to devices which couple two plane surfaces of the kind illustrated diagrammatically in FIGS. 3 and 4. In this embodiment coupling is effected between a driving plate 14 and a driven plate 15 having an axis of rotation y'y. The intermediate part 16 is in the form of a flat thin disc located between the two plates, and recesses 17 are formed radially in the driving plate 14 and are all in communication with a supply pipe for pressurised fluid by means of channels 18 communicating with the bottoms of the recesses. The driving plate is formed with a circular outer rim 19 and with a circular inner rim 20, in which rims there are formed circular grooves 21 in which sealing rings are inserted to ensure a seal between the dirving plate 14 and the intermediate part 16.

Figure 5:
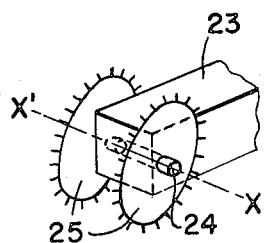
FIG. 5 is a half sectional elevation through an embodiment of the invention suitable for rotationally driving a shaft by means of two elements concentric to the shaft and alternately performing reciprocating rotary movements.
Figure 5:
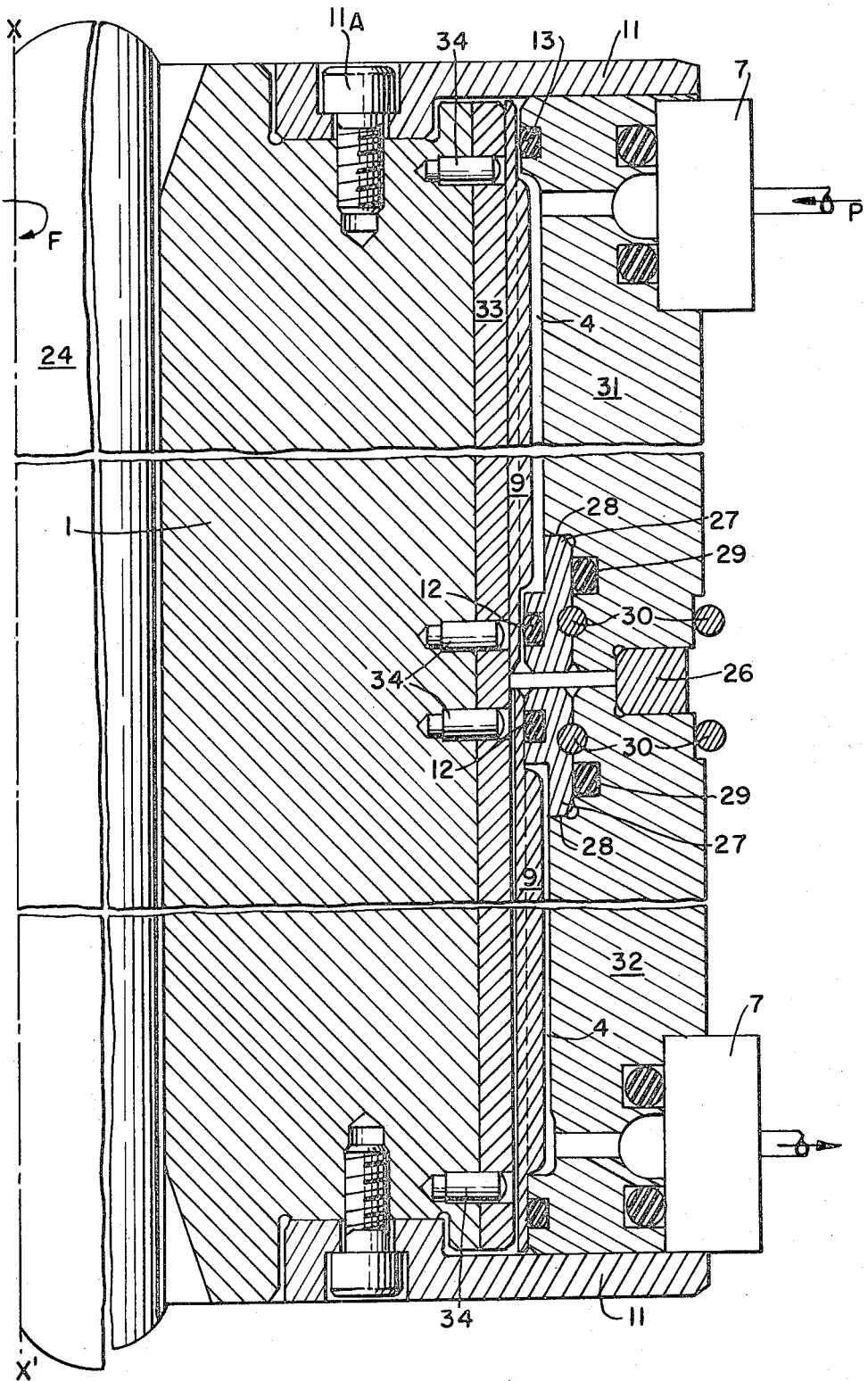

FIG. 5 illustrates another embodiment of the invention which is more particularly suitable for driving a rotary cutting tool of a mining machine for cutting galleries or tunnels by means of a rotary tool which attacks frontally a wall of a gallery being dug. A machine of this kind is described in United Kingdom Patent No. 1,251,545. In this machine, as shown in FIG. 6 a tool carrier arm 23 carries at its end a shaft 24 whose axis extends transversely of the arm, and two cutting discs 25 having peripheral cutting tools, not shown, are rotatably driven by the shaft 24.

FIG. 5 represents the application of the invention to the rotational driving of the shaft 24.

In order to do this the frictional coupling comprises:

a single hub 1 joined to the shaft 24 for rotation therewith, two crowns 31 and 32 separated by a spacer ring 26, and two cylindrical intermediate parts 9, each of which is located between one of the crowns 31, 32 and the hub 1.

For ease of assembly, the recesses 4 formed in each of the crowns are in the form of channels spaced regularly around the inner peripheral surface of each of the crowns and arranged in pairs of two channels situated in line with one another, the contiguous ends of the two channels of a pair being open.

In order to ensure sealing at these open ends of these channels, the grooves 13 into which sealing rings 12 for the open ends of the channels are inserted, are each formed in a ring 27 of suitable shape, which in turn is inserted into a cylindrical recess 28 formed in the corresponding region of the inner wall of the crown. A toric seal 29 ensures sealing between the crown and the ring 27.

In addition, the ring 27 is fixed relative to the crown by means of a circlip engaging the periphery of the crown.

This apparatus is additionally provided with means, not shown, for driving the crowns 31 and 32 alternately in rotary reciprocating movements, and with means, not shown, associated with the driving means for alternately supplying hydraulic fluid at pressure P into the recesses formed in one of the crowns, while simultaneously connecting a return feed to the fluid supply tank to the recesses formed in the other crown. In this way there is effected alternately the coupling of one of the crowns to the hub 1 and the uncoupling of the other crown from the same hub, thus leading to the seemingly continuous driving of the hub 1 and of the shaft 24 in the direction of rotation F which determined the coupling of the hub to that one of the crowns.

In order to reduce the risk of slipping due to a film of oil which may penetrate between the hub and the intermediate parts, the outer surface of the hub which is engaged by the intermediate parts 9 may advantageously be roughened, either by scoring the surface or, as illustrated in FIG. 5, fixing an additional band 33 rigidly to the hub for rotation therewith, by means of pins 34. The outer surface of said band is roughened, for example by knurling the lines which break the continuity of the oil film.

When the pressure P is applied the intermediate part comes into contact with the hub over its entire inner surface, in contrast to known devices in which the intermediate part is connected at its ends to the element with which it forms the expansible chamber so that the zone of the thin wall situated opposite the recess is deformed more than the zones situated on each side of the recess, and it is only the zone opposite the recess which comes into contact with the driven element.

The friction coupling device according to the invention therefore ensures optimum contact between the intermediate part and the hub, the protuberances providing driving connection of the intermediate part with the outer crown.

I claim:

1. A friction coupling comprising:

two co-axial relatively movable members having opposing coupling surfaces disposed one inside the other, the outer one of said members having a plurality of recesses in the form of channels parallel to the axes of said members in its coupling surface and also annular hydraulic fluid inlet means on its inner surface communicating with said recesses;

annular hydrulic fluid supply means fixedly disposed externally of and coaxially with respect to said outer member and simultaneously communicating with said inlet means via circumferentially spaced through bores in said outer member;

a thin intermediate part in the form of a thin cylinder located between the opposing coupling surfaces of said members and having a plurality of protuberances each fitting into one of said recesses without completely filling it; and sealing means located between the intermediate part and said coupling surface of said outer member to form a sealed expansible chamber therebetween, said sealing means including sealing rings disposed in annular grooves formed in the inner surface of the outer member, which groves are so located that the sealing rings bear on the cylindrical intermediate part near its ends, and the depth of which grooves is such that the sealing rings remain compressed against the intermediate part when inward deformation of the intermediate part is a maximum.

2. A coupling according to claim 1, wherein the inner member comprises a band surrounding and fixed to the coupling surface of the inner member, the outer surface of which band is knurled.

* * * * *